(12) United States Patent
Okuda et al.

(10) Patent No.: US 7,647,788 B2
(45) Date of Patent: Jan. 19, 2010

(54) TEMPERATURE MANAGEMENT APPARATUS AND POWER SUPPLY

(75) Inventors: Jun Okuda, Aichi-Gun (JP); Akihiro Aoyama, Osaka (JP); Yusai Murakami, Inzai (JP)

(73) Assignee: Panasonic EV Energy Co., Ltd., Kosai-Shi (JP)

( * ) Notice: Subject to any disclaimer, the term of this patent is extended or adjusted under 35 U.S.C. 154(b) by 414 days.

(21) Appl. No.: 11/366,242

(22) Filed: Mar. 2, 2006

(65) Prior Publication Data
US 2006/0196954 A1 Sep. 7, 2006

(30) Foreign Application Priority Data
Mar. 2, 2005 (JP) ............................. 2005-057991

(51) Int. Cl.
F25D 23/12 (2006.01)
H01M 10/50 (2006.01)
(52) U.S. Cl. .................... 62/259.2; 429/62
(58) Field of Classification Search ............... 62/239, 62/244, 259.2; 165/42; 429/62, 120
See application file for complete search history.

(56) References Cited
U.S. PATENT DOCUMENTS
5,585,204 A 12/1996 Oshida et al.
5,937,664 A * 8/1999 Matsuno et al. ............ 62/259.2
6,330,925 B1 * 12/2001 Ovshinsky et al. .......... 180/65.3
6,819,085 B2 * 11/2004 Kimoto ....................... 320/150
2001/0008720 A1 * 7/2001 Pedicini et al. ............... 429/23
2003/0188901 A1 * 10/2003 Ovshinsky et al. .......... 180/65.2
2005/0028542 A1 * 2/2005 Yoshida et al. ................ 62/186

FOREIGN PATENT DOCUMENTS
JP 10 284137 10/1998
JP 2003-142166 5/2003
JP 2003 217677 7/2003
WO 99/26802 6/1999

* cited by examiner

*Primary Examiner*—Chen-Wen Jiang
(74) *Attorney, Agent, or Firm*—Workman Nydegger

(57) ABSTRACT

A temperature management apparatus for managing the temperature of cells 11, which includes an air intake duct 1, a fan unit 3, a first temperature detector (temperature sensors 25, a temperature detecting part 23) for detecting temperature Tb of the cells 11, a second temperature detector (a temperature sensor 26, a temperature detecting part 23) for detecting ambient temperature Ta, and a control device 20. The fan unit 3 has a fan 4 and a motor 5. The control device 20 has a storage part 22 and a deciding part 21. The storage part 22 stores a cooling-necessitating temperature Tc and a heating-necessitating temperature Th. The deciding part 21 directs the fan unit 3 to drive the fan 4 in a case where the temperature Tb of the cells becomes equal to or higher than both the temperature Ta of the air and the cooling-necessitating temperature Tc, or in a case where the temperature Tb of the cells becomes equal to or lower than both the temperature Ta of the air and the heating-necessitating temperature Th.

4 Claims, 5 Drawing Sheets

TEMPERATURE MANAGEMENT APPARATUS AND POWER SUPPLY

BACKGROUND OF THE INVENTION

1. Field of the Invention

The present invention relates to a temperature management apparatus for managing the temperature of a battery for running mounted on a vehicle such as a hybrid electric vehicle, and a power supply including the temperature management apparatus.

2. Description of Related Art

Recently, hybrid electric vehicles on which an engine and a motor as a power source are mounted have been used. Such a hybrid electric vehicle includes a secondary battery (power supply) as a power source for supplying the driving motor with electric power. The secondary battery is charged or discharged corresponding to the running state of the vehicle.

The secondary battery to be mounted on the hybrid electric vehicle is large and generates a large amount of heat. Furthermore, electrochemical reactions at the time of charging or discharging in the secondary battery rely on temperature. Therefore, when the temperature of the secondary battery exceeds a pre-set temperature, problems can occur. For example, performance of the secondary battery deteriorates or the life is shortened. For preventing these problems, a power supply in a hybrid electric vehicle includes a cooling device for cooling the battery (see JP2003-142166 A, for example).

FIG. 4 is a schematic view showing a configuration of a conventional power supply. The power supply shown in FIG. 4 includes a battery pack 110 and a cooling device. The cooling device feeds air to the interior of the battery pack 110, thereby cooling the battery pack 110 with the air.

Specifically, the battery pack 110 includes a plurality of cells (battery modules) 111 in a battery case 112. An intake 113 for feeding air to the interior and an outlet 114 for exhausting air after a heat exchange are provided for the battery case 112. Furthermore, clearances as channels for the fed air are provided between adjacent cells 111 and between each of the cells 111 and the inner face of the battery case 112.

The cooling device includes an air intake duct 101, an exhaust duct 102 and a fan unit 103. The air intake duct 101 connects the intake 113 of the battery case 112 and an air intake port 109 provided to an interior panel 108 of the vehicle. At the opening of the air intake duct 101 at the side facing the air intake port 109, a filter member 107 is arranged for preventing entry of foreign matters into the battery pack 110.

The exhaust duct 102 connects the outlet 114 of the battery case 112 and an air inlet 103a of the fan unit 103. The fan unit 103 includes a housing 106, a fan 104 arranged inside the housing 106 and a motor 105 for driving the fan 104. An air inlet 103a and an air outlet 103b are provided for the housing 106.

When the fan 104 is driven by the motor 105, air inside the vehicle is fed into the battery case 112 through the air intake duct 101, so that the temperature rising in the respective cells 111 is suppressed. The air warmed by the cells 111 passes through the exhaust duct 102 and is exhausted outside the vehicle through the air outlet 103b provided for the housing 106 of the fan unit 103.

Furthermore, the cooling device shown in FIG. 4 includes a control device 120. The control device 120 includes a deciding part 121, a motor driving part 122 and a temperature detecting part 123, and switches in stages the fan speed (rotation number: 'rpm') of the fan 104 in accordance with the temperature of the cells 111 (for example, 'LOW', 'MIDDLE', and 'HIGH').

Specifically, the temperature detecting part 123 detects temperature on the basis of signals from respective temperature sensors 124 attached to the cells 111. The deciding part 121 takes the highest temperature (battery maximum temperature) from the respective detected temperatures, and decides whether the present fan speed is suitable for the battery maximum temperature.

Upon deciding the fan speed as not suitable, the deciding part 121 selects a suitable fan speed with respect to the detected temperature. Furthermore in this case, the deciding part 121 outputs a signal (fan speed direction signal) to the motor driving part 122 so that a voltage corresponding to the selected fan speed is applied to the motor 105.

The motor driving part 122 switches in stages the voltage to be applied to the motor 105 in accordance with the direction from the deciding part 121 so as to adjust in stages the fan speed of the fan 104. Therefore, when the deciding part 121 outputs the fan speed direction signal, the motor driving part 122 switches the voltage so that the fan 104 will rotate at a selected fan speed.

In this manner, the control device 120 drives the fan 104 while switching the fan speed in stages in order to prevent the temperature of the cells 111 from exceeding a pre-set threshold value, thereby suppressing temperature rising of the cells 111.

However, in the case of the cooling device as shown in FIG. 4, since the temperature sensors 124 are attached only to the cells 111, the control device 120 controls the fan speed of the fan 104 on the basis of the temperature of the cells 111 alone.

Therefore, for example, as shown in FIG. 5, in a case where the vehicle is kept in the direct sun and the temperature of the cells 111 is raised, even when the temperature inside the vehicle becomes higher than the temperature of the cells 111, the control device 120 drives the fan 104. As a result, as indicated as an area B surrounded by a broken line in FIG. 5, the temperature of the cells 111 is raised instead to degrade the performance of the battery.

FIG. 5 is a graph showing a control by a conventional cooling device. FIG. 5 indicates changes in the ambient temperature and the battery temperature, and an operating condition of the fan in a case where the vehicle is kept in the direct sun. The term 'ambient temperature' in FIG. 5 indicates a temperature of air introduced into the battery case 112 through the air intake duct 101, while the same term for the cooling device in FIG. 4 indicates the temperature inside the vehicle. The term 'battery maximum temperature' in FIG. 5 denotes a highest value for the battery temperatures detected on the basis of signals from the respective temperature sensors 124, and the 'battery minimum temperature' denotes a lowest temperature for the battery temperatures detected on the basis of signals from the respective temperature sensors 124.

When the vehicle is kept under a condition where the outside temperature is low and the temperature of the cells 111 is lowered, the control device 120 does not drive the fan 104. Therefore, even if the interior of the vehicle is warmed by heating, the warmed air inside the vehicle will not be introduced into the battery case 112. Therefore in this case, the cells 111 cannot exhibit the desired performance until the temperature is raised by self-heating.

SUMMARY OF THE INVENTION

Therefore, with the foregoing in mind, it is an object of the present invention to provide a temperature management apparatus that can overcome the above-mentioned problems, decrease ambient influences on a battery mounted on a vehicle and prevent degradation in performance of the battery; and a power supply including the temperature management apparatus.

For achieving the above-mentioned objects, a temperature management apparatus according to the present invention is a temperature management apparatus for managing the temperature of a battery housed in a battery case to be mounted on a vehicle. The temperature management apparatus includes an air channel for communicating the interior/exterior of the vehicle and the interior of the battery case, an air feeder for feeding air into the battery case through the air channel, a first temperature detector for detecting a temperature Tb of the battery, a second temperature detector for detecting a temperature Ta of the air passing through the air channel, and a control device. The air feeder has a fan and a motor for driving the fan, and the control device has a storage part and a deciding part. The storage part stores a lower limit Tc of temperature at which the battery needs cooling, and an upper limit Tb of temperature at which the battery needs heating. The deciding part directs the air feeder to drive the fan in a case where the temperature Tb of the battery becomes equal to or higher than both the temperature Ta of the air and the lower limit Tc, or in a case where the temperature Tb of the battery becomes equal to or lower than both the temperature Ta of the air and the upper limit Th.

Furthermore, for achieving the above-mentioned objects, a power supply according to the present invention is a power supply having a battery to be mounted on a vehicle and a temperature management apparatus for managing temperature of the battery. The battery is housed in a battery case, and the temperature management apparatus includes an air channel for communicating the interior/exterior of the vehicle and the interior of the battery case, an air feeder for feeding air into the battery case through the air channel, a first temperature detector for detecting a temperature Tb of the battery, a second temperature detector for detecting a temperature Ta of the air passing through the air channel, and a control device. The air feeder has a fan and a motor for driving the fan, and the control device has a storage part and a deciding part. The storage part stores a lower limit Tc of temperature at which the battery needs cooling, and an upper limit Th of temperature at which the battery needs heating. The deciding part directs the air feeder to drive the fan in a case where the temperature Tb of the battery becomes equal to or higher than both the temperature Ta of the air and the lower limit Tc, or in a case where the battery temperature Tb becomes equal to or lower than both the temperature Ta of the air and the upper limit Th.

As mentioned above, the temperature management apparatus and the power supply according to the present invention carry out a comparison between the temperature Tb of the battery and the temperature (ambient temperature) Ta of air to be introduced into the battery case, and a decision on the conditions of the battery (whether cooling or heating is necessary), and drives the fan on the basis of the results.

Therefore, in a case where the vehicle is kept in the direct sun and the ambient temperature Ta is higher than the battery temperature, the fan is not driven, and thus the rise in the battery temperature can be minimized. Therefore, degradation in the performance caused by the temperature rise can be minimized as well. Furthermore, even in a case where the battery temperature is lowered due to lowering of the outside temperature or the like so as to degrade the battery performance, when the ambient temperature Ta is higher than the temperature of the battery, the fan can be driven to raise the temperature of the battery. Similarly in this case, degradation in the performance can be minimized.

DETAILED DESCRIPTION OF THE INVENTION

A temperature management apparatus according to the present invention is a temperature management apparatus for managing the temperature of a battery housed in a battery case to be mounted on a vehicle. The temperature management apparatus includes an air channel for communicating the interior/exterior the vehicle and the interior of the battery case, an air feeder for feeding air into the battery case through the air channel, a first temperature detector for detecting a temperature Tb of the battery, a second temperature detector for detecting a temperature Ta of air passing through the air channel, and a control device, where the air feeder has a fan and a motor for driving the fan, the control device has a storage part and a deciding part. The storage part stores a lower limit Tc of temperature at which the battery needs cooling and an upper limit Th of temperature at which the battery needs heating, and the deciding part directs the air feeder to drive the fan in a case where the temperature Tb of the battery becomes equal to or higher than both the temperature Ta of the air and the lower limit Tc, or in a case where the temperature Tb of the battery becomes equal to or lower than both the temperature Ta of the air and the upper limit Th. Furthermore, the power supply according to the present invention has a battery to be mounted on a vehicle, and a temperature management apparatus according to the present invention mentioned above.

In the above-mentioned temperature management apparatus and the power supply of the present invention, it is preferable that the battery includes a plurality of cells, the first temperature detector detects temperatures of at least two cells that have been selected from the plural cells, and the deciding part takes the highest temperature $Tb_{max}$ of the cells and the lowest temperature $Tb_{min}$ of the cells from temperatures detected by the first temperature detector, and directs the air feeder to drive the fan in a case where the highest temperature $Tb_{max}$ of the cells (battery maximum temperature) becomes equal to or higher than both the temperature Ta of the air and the lower limit Tc, or in a case where the lowest temperature $Tb_{min}$ of the cells (battery minimum temperature) becomes equal to or lower than both the temperature Ta of the air and the upper limit Th.

In the above-mentioned example, since the battery maximum temperature $Tb_{max}$ and a battery minimum temperature $Tb_{min}$ are detected and a temperature control is carried out on the basis of the detection results, ambient influences on the battery mounted on the vehicle can be reduced further, and degradation in the battery performance can be suppressed. Moreover, according to the example, the temperature of the cells in the battery case can be maintained more uniformly.

Figure 1:
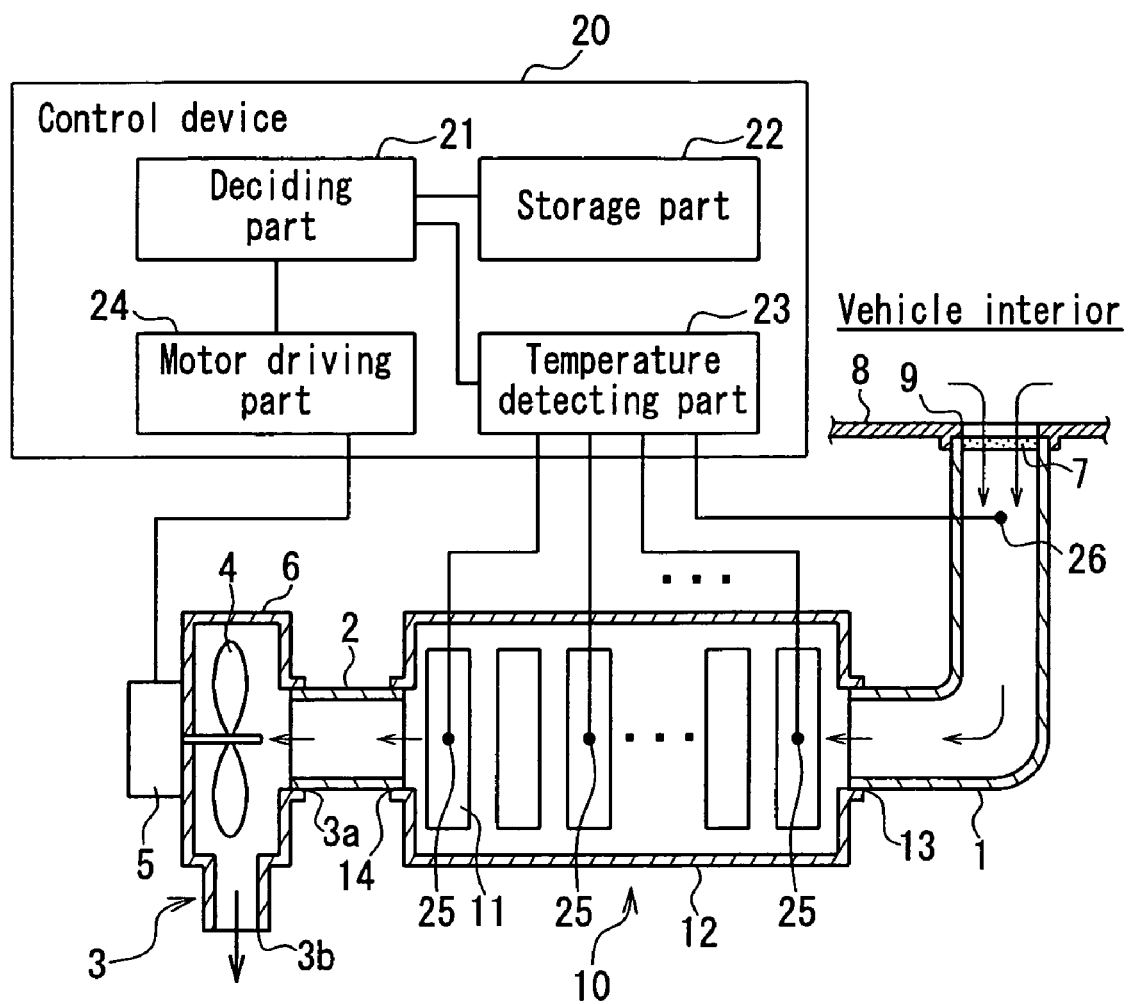
FIG. 1 is a schematic view showing configurations of a temperature management apparatus and a power supply according to an embodiment of the present invention.

Hereinafter, a temperature management apparatus and a power supply according to an embodiment of the present invention will be explained below with reference to FIGS. 1-3. First, configurations of the temperature management apparatus and the power supply according to this embodiment will be described by referring to FIG. 1. FIG. 1 is a schematic view showing configurations of a temperature management apparatus and a power supply according to this embodiment of the present invention. In FIG. 1, components other than a control device 20 are shown in the cross sections.

As shown in FIG. 1, a power supply according to this embodiment includes a battery pack 10 to be mounted on a vehicle such as a hybrid electric vehicle and a temperature management apparatus. In this embodiment, as shown in FIG. 1, the battery pack 10 includes a plurality of cells 11 and battery case 12. The plural cells 11 are housed in the battery case 12. An intake 13 for feeding a cooling air to the interior and an outlet 14 for exhausting air after a heat exchange are provided for the battery case 12. Furthermore, clearances as channels for the fed air are provided between adjacent cells 11 and between each cell 11 and the inner face of the battery case 12.

The temperature management apparatus includes an air intake duct 1, an exhaust duct 2, a fan unit 3 and a control device 20. The air intake duct 1 functions as an air feed channel for communicating the interior of the vehicle and the interior of the battery case 12 so as to feed the air in the vehicle to the battery case. In this embodiment, the air intake duct 1 connects the intake 13 of the battery case 12 and an air intake port 9 provided to an interior panel 8 of the vehicle.

According to this embodiment, a filter member 7 is arranged on the opening of the air intake duct 1 facing the air intake port 9 in order to prevent entry of foreign material into the battery pack 10. The filter member 7 is arranged so that only air passing through the filter material 7 is fed into the battery case 12.

The exhaust duct 2 functions as an exhaust channel for exhausting air in the battery case 12. In this embodiment, the exhaust duct 2 connects the outlet 14 of the battery case 12 and the air inlet 3a of the fan unit 3. The post-heat exchange air is fed to the fan unit 3 through the exhaust duct 2, and exhausted outside the vehicle through the air outlet 3b of the fan unit 3.

The fan unit 3 functions as an air feeder for feeding air into the battery case 12 through the air intake duct 1. The fan unit 3 includes a fan 4, a motor 5 for driving the fan 4 and a housing 6 to house the fan 4. The air inlet 3a and the air outlet 3b of the fan unit 3 are provided for the housing 6.

As mentioned above, according to this embodiment, the air inlet 3a of the fan unit 3 is connected to the exhaust duct 2. Therefore, when the fan 4 is driven by the motor 5, the air in the battery case 12 is drawn so that the air in the vehicle is fed into the battery case 12.

The control device 20 includes a deciding part 21, a storage part 22, a temperature detecting part 23 and a motor driving part 24. Similarly to the motor driving part 122 shown in FIG. 4, the motor driving part 24 switches voltages to be applied to the motor 5 in stages in accordance with the direction from the deciding part 21 so as to adjust the fan speed of the fan 4 in stages. The motor 5 is driven in a constant voltage process.

Figure 4:
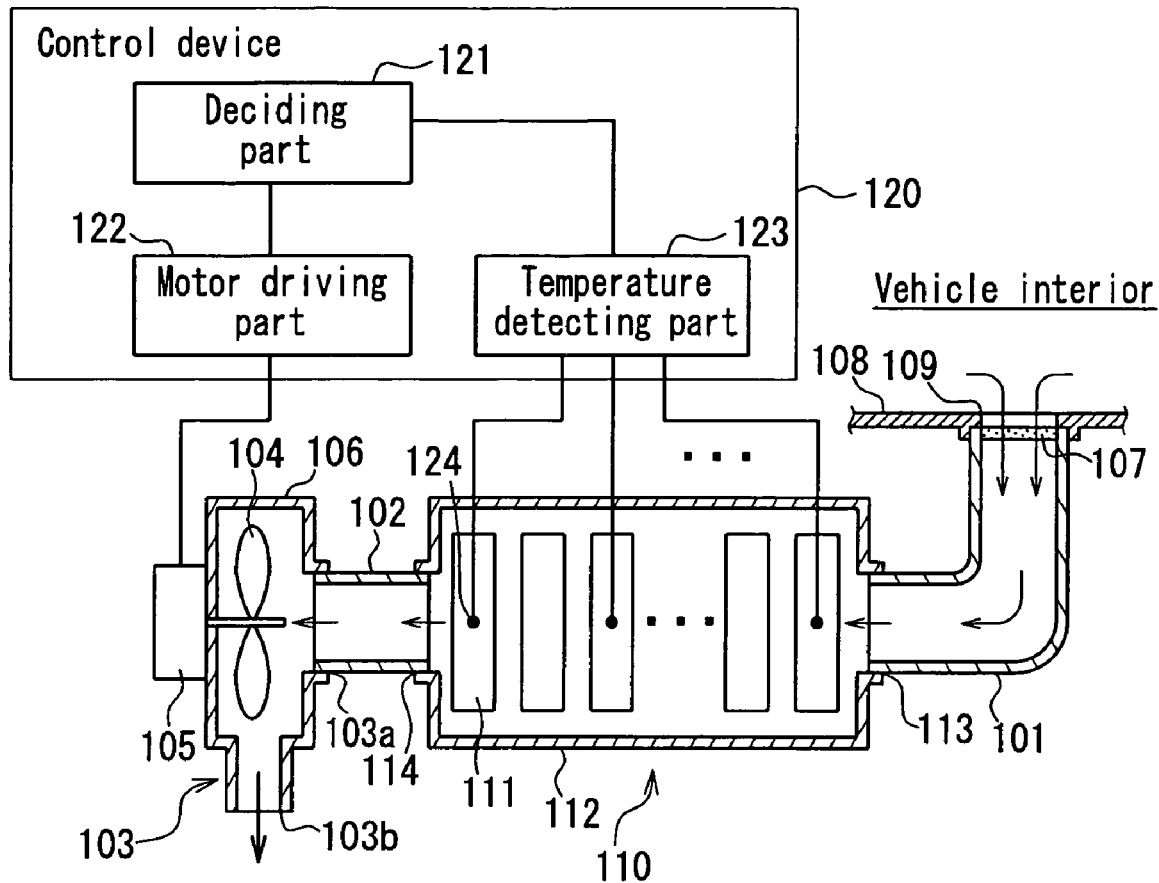
FIG. 4 is a schematic view showing a configuration of a conventional power supply.

The temperature detecting part 23 functions, together with temperature sensors 25 attached to the cells 11, as a temperature detector for detecting the battery temperature. Specifically, similarly to the temperature detecting part 123 as shown in FIG. 4, the temperature detecting part 23 detects the temperatures $Tb_1$-$Tb_n$ (n is a natural number) of the respective cells 11 on the basis of signals from the temperature sensors 25 attached to the cells 11. In this embodiment, the temperature sensors 25 are attached to at least two cells 11 that have been selected from the plurality of cells 11. The temperature detecting part 23 outputs signals for identifying the detected temperatures $Tb_1$-$Tb_n$ of the respective cells 11 to the deciding part 21.

Similarly to the deciding part 121 shown in FIG. 4, the deciding part 21 decides whether the present fan speed is suitable for the detected temperature. When deciding the temperature as not suitable, the deciding part 21 selects a fan speed suitable for the detected temperatures $Tb_1$-$Tb_n$. Furthermore in this case, the deciding part 21 outputs a signal (a fan speed direction signal) to the motor driving part 24 in order to apply to the motor 5 a voltage corresponding to the selected fan speed.

In this manner, similarly to the conventional example as shown in FIG. 4, the control device 20 switches in stages the voltages to be applied to the motor 5 in accordance with the temperatures of the cells 11 so as to adjust the fan speed of the fan 4 in stages.

In this embodiment however, unlike the conventional cooling device as shown in FIG. 4, a temperature sensor 26 is attached to the air intake duct 1 as well. Moreover, the temperature detecting part 23, together with the temperature sensor 26 attached to the air intake duct 1, functions as a second temperature detector for detecting temperature of air passing through the air intake duct 1. Specifically, on the basis of signals from the temperature sensor 26 attached to the air intake duct 1, the temperature detecting part 23 detects also temperature in the vehicle, namely, a temperature (ambient temperature) Ta of air introduced through the air intake duct 1 into the battery case 12. Further, the temperature detecting part 23 outputs signals identifying the detected ambient temperature Ta to the deciding part 21.

The storage part 22 stores the lower limit (cooling-necessitating temperature) Tc at which the battery needs cooling and the upper limit (heating-necessitating temperature) Th at which the battery needs heating. The cooling-necessitating temperature Tc and the heating-necessitating temperature Th are set previously in accordance with the specification of the cells 11, the use condition of the vehicle or the like.

Unlike the conventional embodiment as shown in FIG. 4, the deciding part 21 according to this embodiment decides also the suitability of the fan's driving, by reference to the ambient temperature Ta, the temperatures $Tb_1$-$Tb_n$ of the respective cells, the cooling-necessitating temperature Tc and the heating-necessitating temperature Th. Here, FIG. 2 is referred to for an explanation about a process of decision whether the fan is driven suitably. FIG. 2 is a flow chart showing operations of a control device that forms a cooling device in this embodiment of the present invention.

Figure 2:
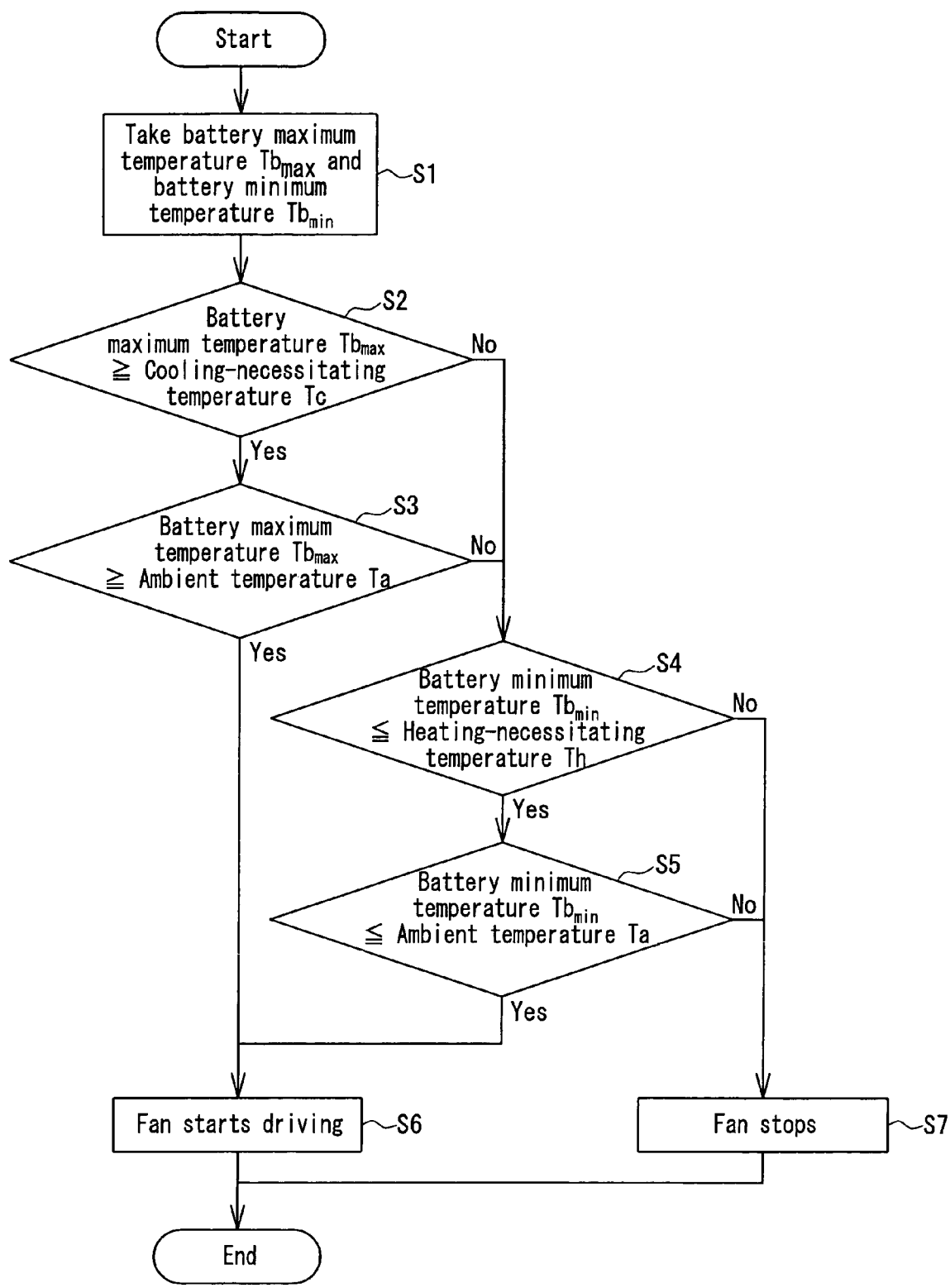
FIG. 2 is a flow chart showing operations of a control device that forms a cooling device according to the embodiment of the present invention.

As shown in FIG. 2, first, the deciding part 21 identifies the temperatures $Tb_1$-$Tb_n$ of at least two of cells 11 attached with temperature sensors 25, on the basis of signals outputted by the temperature detecting part 23, and takes the highest temperature (battery maximum temperature) $Tb_{max}$ and the lowest temperature (battery minimum temperature) $Tb_{min}$ from the temperatures (step S1).

Next, the deciding part 21 decides whether the battery maximum temperature $Tb_{max}$ is equal to or higher than the cooling-necessitating temperature Tc (battery maximum temperature $Tb_{max} \geqq$ cooling-necessitating temperature Tc) (step S2). When the battery maximum temperature $Tb_{max}$ is equal to or higher than the cooling-necessitating temperature Tc, the deciding part 21 decides further whether the battery maximum temperature $Tb_{max}$ is equal to or higher than the ambient temperature Ta (battery maximum temperature $Tb_{max} \geqq$ ambient temperature Ta) (step S3).

When the battery maximum temperature $Tb_{max}$ is equal to or higher than the ambient temperature Ta, the deciding part 21 directs the motor driving part 24 to start driving the motor 5 (step S6), and then ends the process. If the motor 5 has been driven and the fan has been rotating at a suitable fan speed, the deciding part 21 performs, in place of the step S6, a decision on whether the fan speed is suitable and a process according to the decision.

When the battery maximum temperature $Tb_{max}$ is lower than the cooling-necessitating temperature Tc in the step S2, or when the battery maximum temperature $Tb_{max}$ is lower than the ambient temperature Ta in the step S3, the deciding part 21 decides whether the battery minimum temperature $Tb_{min}$ is equal to or lower than the heating-necessitating temperature Th (battery minimum temperature $Tb_{min} \leqq$ heating-necessitating temperature Th) (step S4).

When the battery minimum temperature $Tb_{min}$ is equal to or lower than the heating-necessitating temperature Th, the deciding part 21 decides further whether the battery minimum temperature $Tb_{min}$ is equal to or lower than the ambient temperature Ta (battery minimum temperature $Tb_{min} \leqq$ ambient temperature Ta) (step S5). When the battery minimum temperature $Tb_{min}$ is equal to or lower than the ambient temperature Ta, the deciding part 21 performs the above-mentioned step S6, and then ends the process. Thereby, the motor 5 is driven to rotate the fan.

When the battery minimum temperature $Tb_{min}$ is higher than the heating-necessitating temperature Th in the step S4, or when the battery minimum temperature $Tb_{min}$ is higher than the ambient temperature Ta in the step S5, the deciding part 21 directs the motor driving part 24 not to supply power to the motor 5 in order to stop the fan 4 (step S7). Subsequently, the deciding part 21 discontinues the process.

In this manner, according to this embodiment, the deciding part 21 can manage the battery's temperature on the basis of the temperature (ambient temperature Ta) of the air introduced into the battery case 12. Since the temperature is managed suitably in this manner for the battery according to this embodiment, ambient influences on the battery can be decreased. As a result, the intended performance of the battery can be obtained in a further preferable manner.

For example, when the vehicle is kept under a condition of low outside temperature and thus the temperature of the cells 11 is lowered while the interior of the vehicle is warmed, the deciding part 21 decides 'No' in the step S1, but 'Yes' in steps S4 and S5. As a result, the deciding part 21 starts driving the fan in the step S6. As a result, unlike the conventional example, the battery temperature can be raised rapidly to a temperature at which the battery can exhibit its own performance.

For example, when the vehicle is kept in the direct sun and the temperature in the vehicle is higher than the temperature of the cells 11, decisions in the steps S3 and S4 are 'No', and thus the fan 4 is not driven. In a conventional example, even when the temperature inside the vehicle becomes higher than the temperature of the cells 11, the fan 4 may be driven to raise the temperature of the cells 11 unfavorably. Such a problem can be avoided in this embodiment of the present invention. This point will be explained with reference to FIG. 3.

Figure 3:
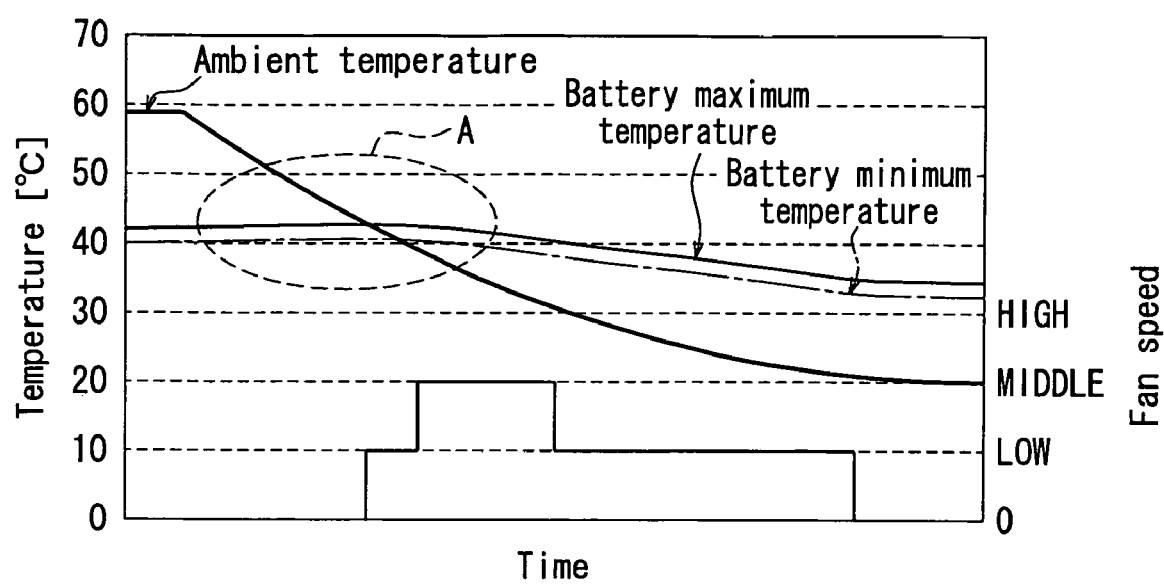
FIG. 3 is a graph showing a control by a temperature management apparatus according to the embodiment of the present invention.

FIG. 3 is a graph showing a control by a temperature management apparatus according to this embodiment of the present invention. FIG. 3 shows changes of the ambient temperature and the battery temperature in a case where the vehicle is kept in the direct sun and also the fan's operating condition for the case. The "ambient temperature" in FIG. 3 denotes a temperature of air to be introduced into the battery case 12 through the air intake duct 1, and for the case of a temperature management apparatus in this example, it denotes a temperature in the vehicle. The "battery maximum temperature" in FIG. 3 denotes a battery maximum temperature $Tb_{max}$ detected by the temperature detecting part 23, and "battery minimum temperature" denotes a battery minimum temperature $Tb_{min}$ detected by the temperature detecting part 23.

Figure 5:
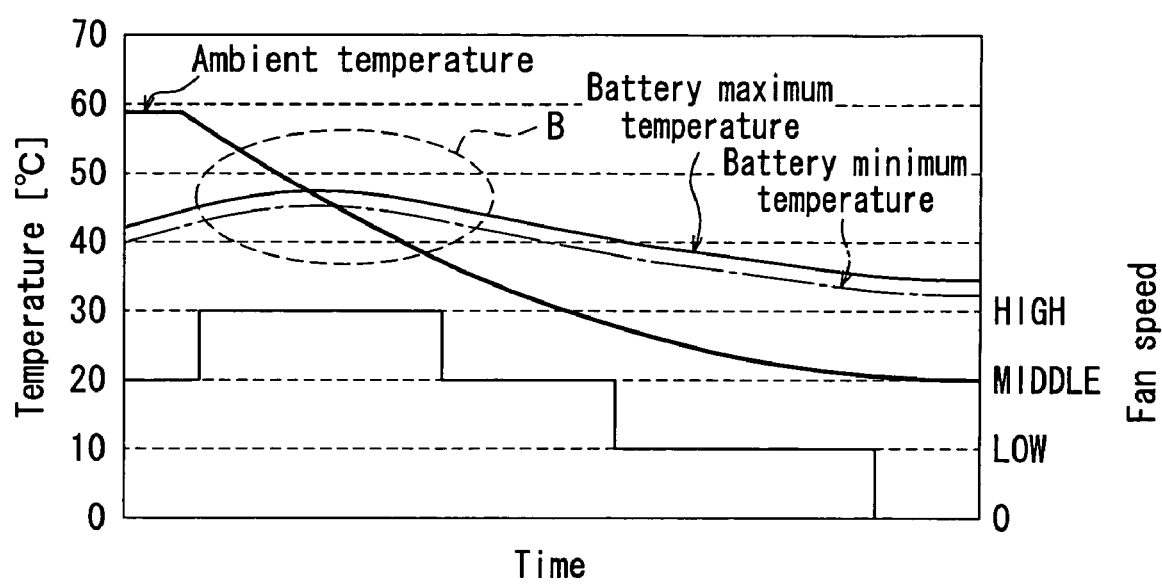
FIG. 5 is a graph showing a control by a conventional cooling device.

As shown in FIG. 3, according to this embodiment, the fan 4 stops under a condition where the ambient temperature Ta is higher than the battery temperature. Therefore, as indicated by the region 'A' surrounded by a broken line in FIG. 3, a temperature rising caused by driving of the fan 4 is suppressed in this example, unlike the conventional example as shown in FIG. 5.

In this embodiment, processes are performed by using the battery maximum temperature and the battery minimum temperature as the battery temperatures. However, the present invention is not limited to this example. When variation in the temperatures among the respective cells 11 is small (for example, when the variation is not more than 5° C.), the processes can be performed by using an average value (average battery temperature) of the temperatures $Tb_1$-$Tb_n$ of the respective cells. In this case, effects similar to those of this embodiment can be obtained.

In this embodiment, the processes as shown in FIG. 2 may be performed only when starting use of the vehicle (for example, at the time of inserting a key). However, they can be performed at a constant interval, or further, on a real time basis. Though not shown, furthermore, a sensor for measuring the outside temperature can be provided so that the deciding part 21 performs the processes as shown in FIG. 2 only when the outside temperature is 30° C. or higher, or when the outside temperature is 0° C. or lower. An alternative of the processes shown in FIG. 2 can include performing the steps S4 and S5 in this order after the step S1, and performing the steps S2 and S3 subsequent to a decision of 'No' at any of the steps S4 and S5.

In this embodiment, for reducing power consumption and lowering noise, the deciding part 21 can decide whether the fan speed of the fan 4 is suitable or not on the basis of the battery temperature and a difference between the battery temperature and the ambient temperature. Specifically, the deciding part 21 calculates a temperature difference ΔT on the basis of the Equation (1) below, and adapts the thus calculated ΔT and the battery maximum temperature $Tb_{max}$ to the fan speed map as shown in the Table 1 below so as to decide whether it is a suitable fan speed or not. The fan speed map has been stored previously in the storage part 22. In the Table 1 below, α1, α2, T1, T2 and T3 are threshold values that have been set previously.

$$\Delta T = \text{battery maximum temperature } Tb_{max} - \text{ambient temperature } Ta \quad (1)$$

TABLE 1

Fan speed map

| | $\Delta T < \alpha 1$ | $\alpha 1 \leq \Delta T < \alpha 2$ | $\alpha 2 \leq \Delta T$ |
|---|---|---|---|
| $Tb_{max} < T1$ | OFF | OFF | OFF |
| $T1 \leq Tb_{max} < T2$ | LOW | LOW | LOW |
| $T2 \leq Tb_{max} < T3$ | MIDDLE | LOW | LOW |
| $T3 \leq Tb_{max}$ | HIGH | HIGH | MIDDLE |

In an exemplified setting, T1=25° C., T2=35° C., T4=45° C., $\alpha 1$=5° C., and $\alpha 2$=20° C. In such an example, when the fan speed is set to "MIDDLE", the battery maximum temperature $Tb_{max}$ is 40° C., and the ambient temperature Ta is lower than 20° C., the deciding part 21 decides, on the basis of the above Equation (1) and the fan speed map in the above Table 1, that a suitable fan speed is "LOW". Thereby, the deciding part 21 outputs a fan speed direction signal and changes the fan speed to "LOW".

As mentioned above, in the above example, in a case where there is a great difference between the battery maximum temperature $Tb_{max}$ and the ambient temperature Ta so that sufficient cooling effect is obtainable even if the fan speed is not so high, the power consumption and rotation number of the fan 4 will not exceed the required level, thereby power consumption and noise can be suppressed. The above example where the fan speed is decided by using the battery maximum temperature $Tb_{max}$ does not limit the present invention, but the battery maximum temperature $Tb_{max}$ can be replaced by the battery minimum temperature $Tb_{min}$ or an average value (average battery temperature) of the temperatures $Tb_1$-$Tb_n$ of the respective cells.

The temperature management apparatus and the power supply according to the present invention configure a part of a hybrid electric vehicle or any other vehicle on which a battery for running is mounted, and they provide industrial availability.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A temperature management apparatus for managing temperature of a battery housed in a battery case to be mounted on a vehicle, the temperature management apparatus comprising:

an air channel for communicating the interior/exterior of the vehicle and the interior of the battery case, an air feeder for feeding air into the battery case through the air channel, a first temperature detector for detecting a temperature Tb of the battery, a second temperature detector for detecting a temperature Ta of the air passing through the air channel, and a control device, the air feeder has a fan and a motor for driving the fan, the control device has a storage part and a deciding part, the storage part stores a lower limit Tc of temperature at which the battery needs cooling, and an upper limit Th of temperature at which the battery needs heating, the deciding part directs the air feeder to drive the fan when the temperature Tb of the battery becomes equal to or higher than both the temperature Ta of the air and the lower limit Tc, or when the temperature Tb of the battery becomes equal to or lower than both the temperature Ta of the air and the upper limit Th, wherein the deciding part generates a fan speed direction signal based on a difference between the temperature Tb of the battery and the temperature Ta of the air and wherein the deciding part adapts the difference between the temperature Tb and the temperature Ta to a fan speed map indicative of the relationship between the fan speed and the temperature Tb of the battery for several differences to generate a fan speed direction signal for optimizing cooling effect of the battery, wherein the fan speed map is set to generate a fan speed direction signal for driving the fan at lower fan speeds to suppress noise and power consumption when the difference between the temperature Tb of the battery and the temperature Ta of the air is equal to or higher than a threshold value and the temperature Tb of the battery is within a predetermined temperature range.

2. The temperature management apparatus according to claim 1, wherein the battery comprises a plurality of cells, the first temperature detector detects temperatures of at least two cells that have been selected from the plural cells, and the deciding part takes the highest temperature $Tb_{max}$ of the cells and the lowest temperature $Tb_{min}$ of the cells from temperatures detected by the first temperature detector, and directs the air feeder to drive the fan when the highest temperature $Tb_{max}$ of the cells becomes equal to or higher than both the temperature Ta of the air and the lower limit Tc, or when the lowest temperature $Tb_{min}$ of the cells becomes equal to or lower than both the temperature Ta of the air and the upper limit Th.

3. A power supply comprising a battery to be mounted on a vehicle and a temperature management apparatus for managing temperature of the battery, wherein the battery is housed in a battery case, the temperature management apparatus comprises an air channel for communicating the interior/exterior of the vehicle and the interior of the battery case, an air feeder for feeding air into the battery case through the air channel, a first temperature detector for detecting a temperature Tb of the battery, a second temperature detector for detecting a temperature Ta of the air passing through the air channel, and a control device, the air feeder has a fan and a motor for driving the fan, the control device has a storage part and a deciding part, the storage part stores a lower limit Tc of temperature at which the battery needs cooling, and an upper limit Th of temperature at which the battery needs heating, and the deciding part directs the air feeder to drive the fan when the temperature Tb of the battery becomes equal to or higher than both the temperature Ta of the air and the lower limit Tc, or when the temperature Tb of the battery becomes equal to or lower than both the temperature Ta of the air and the upper limit Th, wherein the deciding part generates a fan speed direction signal based on a difference between the temperature Tb of the battery and the temperature Ta of the air wherein the deciding part adapts the difference between the temperature Tb and the temperature Ta to a fan speed map indicative of the relationship between the fan speed and the temperature Tb of the battery for several differences to generate a fan speed direction signal for optimizing cooling effect of the battery, wherein the fan speed map is set to generate a fan speed direction signal for driving the fan at lower fan speeds to suppress noise and power consumption when the difference between the temperature Tb of the battery and the temperature Ta of the air is equal to or higher than a threshold value and the temperature Tb of the battery is within a predetermined temperature range.

4. The power supply according to claim 3, wherein the battery comprises a plurality of cells, the first temperature detector detects temperatures of at least two cells that have been selected from the plural cells, and the deciding part takes the highest temperature $Tb_{max}$ of the cells and the lowest temperature $Tb_{min}$ of the cells from temperatures detected by the first temperature detector, and directs the air feeder to drive the fan when the highest temperature $Tb_{max}$ of the cells becomes equal to or higher than both the temperature Ta of the air and the lower limit Tc, when the lowest temperature $Tb_{min}$ of the cells becomes equal to or lower than both the temperature Ta of the air and the upper limit Th.

* * * * *

UNITED STATES PATENT AND TRADEMARK OFFICE
CERTIFICATE OF CORRECTION

PATENT NO.       : 7,647,788 B2                                    Page 1 of 1
APPLICATION NO. : 11/366242
DATED            : January 19, 2010
INVENTOR(S)      : Okuda et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 442 days.

Signed and Sealed this

Sixteenth Day of November, 2010

David J. Kappos
*Director of the United States Patent and Trademark Office*